United States Patent
Diab et al.

(10) Patent No.: US 7,839,872 B2
(45) Date of Patent: *Nov. 23, 2010

(54) METHOD AND SYSTEM FOR AN ASYMMETRIC OPTICAL PHY OPERATION FOR ETHERNET A/V BRIDGING AND ETHERNET A/V BRIDGING EXTENSIONS

(75) Inventors: Wael William Diab, San Francisco, CA (US); Yongbum Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 11/864,136

(22) Filed: Sep. 28, 2007

(65) Prior Publication Data

US 2008/0285981 A1   Nov. 20, 2008

Related U.S. Application Data (60) Provisional application No. 60/917,870, filed on May 14, 2007.

(51) Int. Cl.
*H04L 12/56* (2006.01)
(52) U.S. Cl. ......................... 370/401; 398/71
(58) Field of Classification Search ................. 370/401; 398/71; 380/200; 714/758
See application file for complete search history.

(56) References Cited

U.S. PATENT DOCUMENTS

| | | | |
|---|---|---|---|
| 2006/0034295 A1 | 2/2006 | Cherukuri et al. | |
| 2007/0014575 A1* | 1/2007 | Kramer et al. | 398/71 |
| 2007/0280239 A1 | 12/2007 | Lund | |
| 2008/0031448 A1* | 2/2008 | Dang et al. | 380/200 |
| 2008/0115037 A1* | 5/2008 | Effenberger | 714/758 |
| 2008/0159304 A1* | 7/2008 | Ozugur et al. | 370/401 |

* cited by examiner

*Primary Examiner*—Albert T Chou
(74) *Attorney, Agent, or Firm*—McAndrews, Held & Malloy, Ltd.

(57) ABSTRACT

Optical signals may be communicated with A/V Bridging services between an upstream link partner and a down stream link partner, each comprising an asymmetric Ethernet optical physical layer (PHY). High bandwidth A/V optical signals may be transmitted from the upstream link partner and low bandwidth optical signals may be transmitted from the downstream link partner. One or more of a time stamp, a traffic class and/or a destination address may be utilized in generating PDUs and managing communications via the asymmetric Ethernet optical PHY. The receiving link partner may register for delivery of the PDUs. An aggregate communication rate may be distributed evenly or unevenly among one or more optical links for transmission and aggregated upon reception via asymmetric Ethernet optical PHY operations. Compressed, uncompressed, encrypted and/or unencrypted optical signals may be handled. Signal processing may comprise forward error checking and clock recovery.

26 Claims, 5 Drawing Sheets

METHOD AND SYSTEM FOR AN ASYMMETRIC OPTICAL PHY OPERATION FOR ETHERNET A/V BRIDGING AND ETHERNET A/V BRIDGING EXTENSIONS

CROSS-REFERENCE TO RELATED APPLICATIONS/INCORPORATION BY REFERENCE

This application makes reference to and claims priority to U.S. Provisional Application Ser. No. 60/917,870, filed on May 14, 2007, entitled "Method and System for Ethernet Audio/Video Bridging," which is hereby incorporated herein by reference in its entirety.

FIELD OF THE INVENTION

Certain embodiments of the invention relate to high-speed communication. More specifically, certain embodiments of the invention relate to a method and system for an asymmetric optical PHY operation for Ethernet A/V Bridging and Ethernet A/V Bridging extensions.

BACKGROUND OF THE INVENTION

The multimedia consumer electronics market is rapidly evolving with increasingly sophisticated audio/video products. Consumers are becoming accustomed to high definition video in their home entertainment centers as well as high end graphic capabilities on personal computers. Several audio/video interface standards have been developed to link a digital audio/video source, such as a set-top box, DVD player, audio/video receiver, digital camera, game console or personal computer with an audio/video rendering device such as a digital television, a high definition video display panel or computer monitor. Examples of digital video interface technology available for consumer electronics comprise High-Definition Multimedia Interface (HDMI), Display Port, Digital Video Interface (DVI) and Unified Display Interface (UDI) for example. These audio/video interfaces may each comprise unique physical interfaces and communication protocols.

The IEEE 802.3 standard defines the (Medium Access Control) MAC interface and physical layer (PHY) for Ethernet connections at 10 Mbps, 100 Mbps, 1 Gbps, and 10 Gbps data rates. Data rates and/or link distances may be improved however with more sophisticated component technologies. In some cases, newer technologies may be incorporated to enhance the performance of legacy infrastructure. For example, laser diodes with narrower bandwidth such as distributed feedback (DFB) lasers may provide higher coupling efficiencies. Receiver sensitivity may be improved by utilizing avalanche photodiodes (APD) rather than P-intrinsic-N (PIN) diodes. Signal processing techniques such as clock recovery and pre-emphasis may extend optical link range. Moreover, high performance fiber properties may reduce impairments such as fiber attenuation, modal distortion and/or material dispersion that may limit the data rate and/or the distance that an optical signal can travel effectively.

As higher data rates are sought, Ethernet standards are developed to support higher transmission rates and/or greater transmission distances over fiber infrastructure. Accordingly, various IEEE 802.3 standards have been ratified for 10 Gigabit-per-second (Gbps) rates. 10GBASE-SR may support short distance links between 26 m and 82 m utilizing multimode fiber. However, link distances may vary according to the physical properties of the fiber medium utilized. For example 10GBASE-SR may achieve improved link distances up to 300 m when new 50 micron 2000 MHz·km multimode fiber is utilized. Notwithstanding, 10GBASE-LRM may support distances up to 208 m over legacy multimode fiber. Long range optical 10GBASE-LR and extended range optical 10GBASE-ER may support distances of 10 km and 40 km respectively over single mode fiber. In another IEEE 802.3 technology, 10GBASE-LX4 utilizes four separate laser sources each operating at 3.125 Gbps with coarse wavelength division multiplexing (CWDM) to achieve an aggregate 10 Gbps rate. In this regard, 10GBASE-LX4 may support link distances in the range of 240 m to 300 m over multimode fiber or 10 km over single mode fiber. Even greater speeds may be achieved as present efforts exist within IEEE working groups for increasing transmission rates to 40 Gbps and 100 Gbps over existing fiber. In addition, non-standard technologies such as 1000BASE-ZX supporting 70 km links and 10GBASE-ZR supporting 80 km links are in use. Furthermore, non-standard or intermediate data rates may be utilized to improve performance and/or create implantation efficiencies. For example, a 10 Gbps interface may be clocked at a lower rate such as 2.5 Gbps or 5 Gbps. In this regard, a greater distance may be reached without significant impairments to the optical signal. Alternatively, transmitter and/or receiver optical sub systems may be simplified due to the lower rate traffic also without significant impairments to the optical signal.

MAC layer processes may also enable higher transmission rates for audio and video data by addressing quality of service issues such as latency restrictions. For example, A/V Bridging (AVB) comprises a set of specifications, which define service classes (or AVB services) that enable the transport of audio/video (A/V) streams (and/or multimedia streams) across an AVB-enabled network (or AVB network) based on selected quality of service (QoS) descriptors. Specifications, which enable the definition of AVB service classes, include the following.

A specification, which enables a set of AVB-enabled devices (or AVB devices) within an AVB network to exchange timing information. The exchange of timing information enables the devices to synchronize timing to a common system clock, which may be provided by a selected one of the AVB devices within the AVB network.

A specification, which enables an AVB destination device to register a request for delivery of a specified AV stream from an AVB source device. In addition, an AVB source device may request reservation of network resource, which enables the transmission of a specified AV stream. The Stream Reservation Protocol (SRP) defined within the specification provides a mechanism by which the AVB source device may register the request to reserve resources within the AVB network (such as bandwidth) to enable the transmission of the specified AV stream. The Multiple Multicast Registration Protocol (MMRP) may enable an AVB destination device to register the request for delivery of a specified AV stream.

A specification, which defines procedures by which AV streams are transported across the AVB network. These procedures may include methods for the queuing and/or forwarding of the AV streams by individual AVB devices within the AVB network.

A typical AVB network comprises a set of AVB devices, which are collectively referred to as an AVB block. An AVB network may comprise wired or optical local area networks (LANs) and/or wireless LANs (WLANs), for example. Individual AVB devices within the AVB network may include AVB-enabled endpoint computing devices (such as laptop computers and WLAN stations), AVB-enabled switching devices (AV switches) within LANs and AVB-enabled access points (APs) within WLANs, for example. Within the AVB block, AV destination devices may request AV streams from AV source devices, which may be transported across the AVB network within specified latency target values as determined from the QoS descriptors associated with delivery of the AV stream.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method is provided for an asymmetric optical PHY operation for Ethernet A/V Bridging and Ethernet A/V Bridging extensions, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for transmitting and receiving Audio/Video Bridging (AVB) streams between devices wherein each device may comprise a Media Access Control (MAC) layer supporting AVB services and an asymmetric Ethernet optical physical layer (PHY). The MAC layer functions that support AVB may enable the end-to-end transport of Ethernet frames based on specified latency targets by initiating admission control procedures. The asymmetrical Ethernet optical PHY functions may enable transmission of AVB streams at a first data rate and reception of AVB streams at a second data rate on each of an upstream device and a down stream device. The first data rate may be different from the second data rate.

For example, the upstream device may transmit high bandwidth audio, video (A/V) and/or auxiliary data signals at a first data rate and receive lower bandwidth auxiliary data signals at a second data rate that may be a slower standard or non-standard data rate. Auxiliary data may comprise for example control and/or configuration signals, input from peripheral devices such as keyboards and/or mice, and/or information utilized for security operations such as encryption keys for example. Notwithstanding, the downstream device may transmit the lower bandwidth auxiliary data signals at the first data rate and receive high bandwidth A/V and/or auxiliary signals at the second data rate.

Although AVB services may support video, audio and/or auxiliary data transfers, the invention is not limited in this regard. For example, the AVB services may be utilized to support any latency or bandwidth sensitive data.

Various embodiments of the invention may enable more economical solutions for extending range and/or increasing the capacity of the fiber. For example, lower bandwidth upstream transmissions may benefit from signal processing techniques as well as transmitter, receiver and/or fiber technologies designed for higher data rates.

Figure 1A:
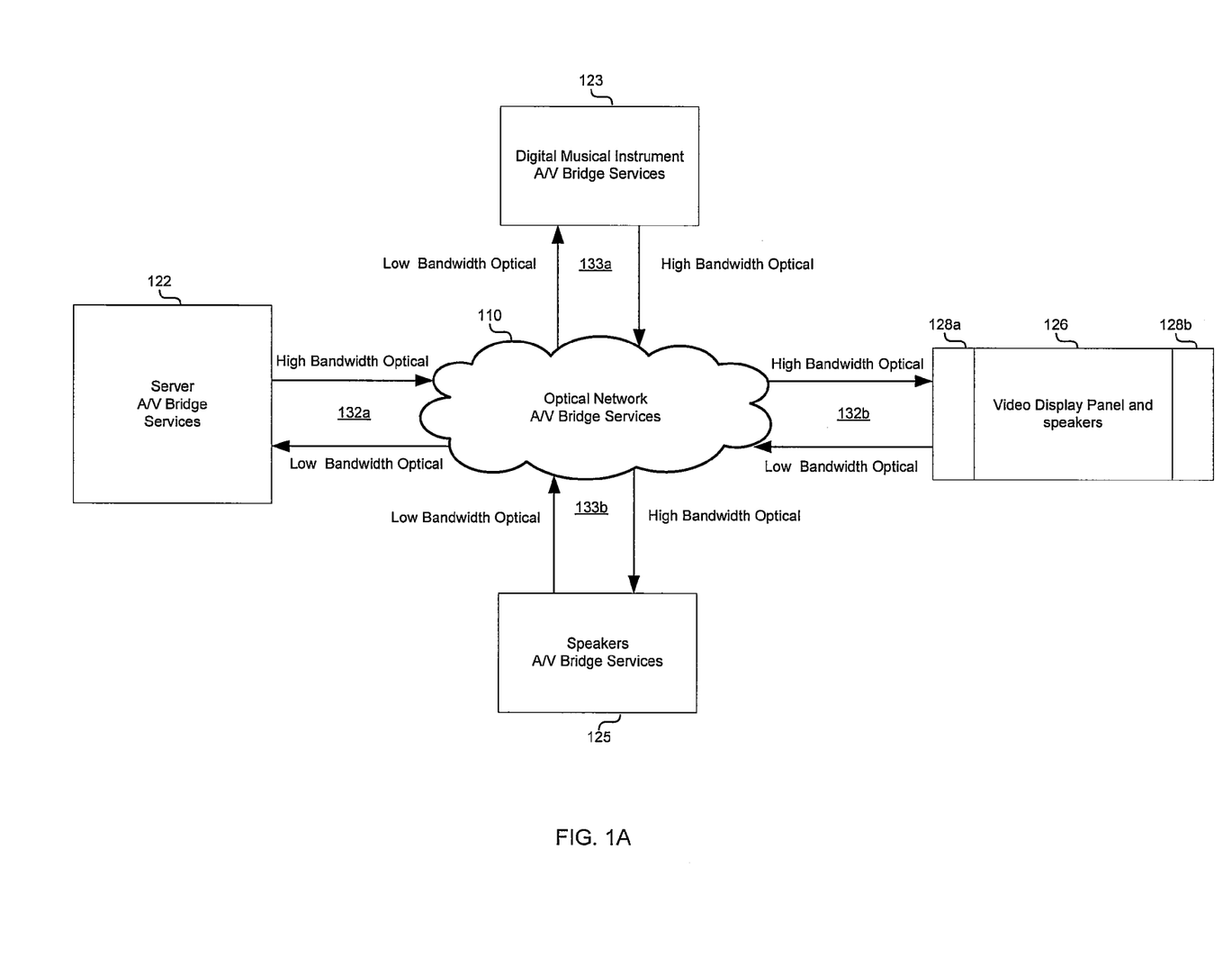
FIG. 1A is a diagram illustrating an exemplary system for transfer of video and/or audio data wherein Audio/Video Bridging (AVB) services may be implemented via an asymmetric Ethernet optical physical layer (PHY) connection, in accordance with an embodiment of the invention.

FIG. 1A is a diagram illustrating an exemplary system for transferring video, audio (A/V) and/or auxiliary data via a network utilizing Audio/Video Bridging (AVB) by a media access control (MAC) layer and an asymmetric Ethernet optical physical layer (PHY) connection, in accordance with an embodiment of the invention. Referring to FIG. 1A, there is shown a server 122, a video display panel 126, speakers 128a and 128b, a plurality of optical Ethernet links 132a and 132b, an optical network 110, a digital musical instrument 123, speakers 125 and optical Ethernet links 133a and 133b.

The server 122 may be, for example, a computer graphics or a video server and may operate within a computing cluster or may operate from a remote location via the optical network 110 and AVB services. In this regard, the server 122 may be located in a central office for example. In some embodiments of the invention the server 122 may be general purpose computer for example a personal computer or laptop. The server 122 may be enabled to operate within a public and/or private network such as a professional A/V service provider network, an enterprise network and/or a personal network. In addition, the server 122 may be enabled to transfer HD multimedia data across optical network links and/or nodes, to one or more destination devices. In this regard the server 122 may be enabled to handle point to point communication as well as point to multipoint communication. The server 122 may be communicatively coupled to the video display panel 126 and speakers 128a and 128b via the optical Ethernet links 132a and 132b and the optical network 110. The server 122 may be enabled to transfer high bandwidth data, for example, A/V data to the video display panel 126 and speakers 128a and 128b and receive lower bandwidth data from at least the video display panel 126 and speakers 128a and 128b. The server 122 may comprise an Ethernet media access control (MAC) layer for encapsulating data in Ethernet frames and to perform transmission control during data transfers. In this regard, the MAC layer may support Audio/Video Bridging (AVB) services wherein end to end quality of service operations may be enabled according to traffic class designations associated with Ethernet frames. In addition, the server 122 may comprise and asymmetric Ethernet optical PHY transceiver. In other embodiments of the invention, the server 122 may be, for example, a personal computer, a DVD player, a video game console and/or an A/V receiver. The invention is not limited to these examples and may comprise any suitable source of data.

The video display panel 126 and speakers 128a and 128b may comprise suitable logic, circuitry and or code to exchange information with the server 122 via the optical Ethernet links 132a and 132b and the optical network 110. Tasks performed by the video display panel 126 and speakers 128a and 128b may comprise reception of Ethernet frames via the optical Ethernet link 132b and determination of the payload within Ethernet frames. For example, the payload may comprise A/V content that may be native video or A/V content that is formatted by a display interface process such as HDMI, Display Port or DVI. In addition, the video display panel and speakers 128a and 128b may extract the formatted or native A/V content from the Ethernet frames and may render the A/V content. In this regard, if the A/V data is formatted, the A/V data may comprise instructions for rendering the formatted video data on the video display panel 126 and speakers 128a and 128b, for example. Thus, various embodiments of the invention may enable the video display panel 126 and speakers 128a and 128b to function as a "thin client" device that may not comprise high performance hardware and/or software capabilities utilized in the generation of multimedia content for high performance video and/or graphics applications. This in turn may enable the rendering of high performance video and/or graphics on the remote video display panel 126 and speakers 128a and 128b.

In addition, the video display panel 126 and speakers 128a and 128b may comprise an Ethernet MAC layer for encapsulating data in Ethernet frames and for administration of transmission to and reception from the server 122 via optical Ethernet links 132a, 132b and the optical network 110. In this regard, the MAC layer may support Audio/Video Bridging (AVB) services wherein end to end quality of service operations may be applied according to traffic class designations associated with Ethernet frames. Also, the video display panel 126 and speakers 128a and 128b may comprise an asymmetric Ethernet optical PHY transceiver linked via the optical network 110 and optical Ethernet links 132a and 132b. Moreover, the video display panel 126 and speakers 128a and 128b may comprise suitable logic, circuitry and or code to process received A/V and/or auxiliary data from the server 122 for rendering.

The video display panel 126 and speakers 128a and 128b may comprise suitable logic circuitry, and/or code that may enable exchanging A/V and or auxiliary data with the server 122 via optical Ethernet links 132a, 132b and the optical network 110 as well as rendering the video and/or audio content. In this regard, the received data may comprise instructions and/or control information that be utilized for the rendering processes.

The optical Ethernet links 132a, 132b, 133a and 133b may comprise suitable logic, circuitry and/or code to support asymmetric Ethernet optical PHY operations. Exemplary optical Ethernet links may comprise an optical wave guide or a fiber cable transmission medium made of glass or plastic fibers. Various material compositions and dimensional relationships within a fiber medium may improve the performance of signal transmissions by reducing distortion and attenuation of an optical signal. The optical Ethernet links may comprise a single strand or multiple strands. In addition, the optical Ethernet links may be single mode, for example, 100BASE-LX10 comprising two fibers, 1000BASE-LX comprising two fibers, 100BASE-BX10, 1000BASE-BX10, 1000BASE-ZX, 10GBASE-LR and 10GBASE-ER or the optical Ethernet links may be multimode, for example 100BASE-LX10 comprising two fibers, 1000BASE-SX, 10GBASE-SR and 10GBASE-LRM. The standard 10GBASE-LX4 supports both multimode and single mode fiber. Signals may be imposed on the fiber via modulated light from a laser or LED. The optical signals may be unidirectional within a fiber strand or may be bidirectional within a fiber strand. Bidirectional standards may comprise 100BASE-BX10, 1000BASE-BX10, 1000BASE-PX10 and 1000BASE-PX20 that have different standards for upstream and downstream transmissions.

Moreover, the standards 1000BASE-PX10 and 1000BASE-PX20 may support asymmetrical Ethernet optical PHY operations in a point to multipoint data exchange wherein downstream high data rate traffic may comprise a 10 Gbps continuous data stream and the upstream low data rate traffic from multiple sources may be time division multiplexed. In another embodiment of the invention, wave division multiplexing may be utilized to transmit high data rate A/V signals and auxiliary signals on the downlink as well as carrying multiple lower bandwidth signals from multiple sources on the uplink.

The optical Ethernet links 132a, 132b, 133a and 133b may be enabled to handle communications administered by quality of service mechanisms for example A/V Bridging. The optical Ethernet link 132a may be communicatively coupled with the server 122 and the optical network 110 wherein asymmetrical optical traffic may be exchanged. The optical Ethernet link 132b may be communicatively coupled with the optical network 110 and video display panel 126 and the speakers 128a and 128b wherein asymmetrical optical traffic may be exchanged. The optical Ethernet link 133a may be communicatively coupled with the digital musical instrument 123 and the optical network 110 wherein asymmetrical optical traffic may be exchanged. The optical Ethernet link 133b may be communicatively coupled with the optical network 110 and the speakers 125 wherein asymmetrical optical traffic may be exchanged.

The optical network 110 may comprise suitable logic, circuitry and or code to transfer optical signals between one or more data source devices for example the server 122 and one or more data destination devices for example the video display panel 126 and the speakers 128a and 128b. The optical network 110 may comprise one or more intermediate devices to restore, improve or direct an optical signal. Intermediate devices may comprise an optical switch or bridge, an optical amplifier, an optoelectronic repeater, a passive optical splitter, an add/drop multiplexer, a wavelength converting transponder, an optical cross connects The optical network 110 may support AVB services and one or more of symmetric Ethernet optical PHY operations and/or asymmetric Ethernet optical PHY operations according to an embodiment of the invention. The optical network 110 may be communicatively coupled with the server 122 display panel 126 and the speakers 128a and 128b, the digital musical instrument 123 and the speakers 125 via the optical Ethernet links 132a, 132b, 133a and 132b respectively.

The digital musical instrument 123 may comprise suitable logic, circuitry and/or code to transfer audio data at a high data rate to, for example, the speakers 125 via the optical network 110 and the optical Ethernet links 133a and 133b utilizing AVB services. In this regard, digital musical instrument 123 may comprise an Ethernet media access control (MAC) layer for encapsulating data in Ethernet frames and providing transmission control to the speakers 125. In addition, the MAC layer within the digital musical instrument 123 may support Audio/Video Bridging (AVB) services wherein end to end quality of service operations may be enabled according to traffic class designations associated with Ethernet frames. Moreover, the digital musical instrument 123 may comprise an asymmetric Ethernet optical PHY transceiver wherein high data rate audio may be transmitted to the optical network 110 and lower data rate signals comprising for example control, configuration and/or security data, may be received from the optical network 110 via the optical Ethernet link 133a. Accordingly, the speaker system 125 may receive the high data rate audio signals from the optical network 110 and transmit the lower data rate signals to the optical network 110 via the optical Ethernet link 133b.

In operation, the server 122 may comprise A/V and/or auxiliary data that may enable rendering of the AV data on the video display panel 126 and speakers 128a and 128b. A user may request a transfer of A/V data from the upstream server 122 via the optical network 110 to the down stream video display panel 126 and speakers 128a and 128b. The server 122 may process the A/V data prior to transmission. For example, the A/V data may comprise native video or may be formatted by a display interface process such as HDMI, Display Port or DVI along with auxiliary data for example. A MAC layer within the server 122 may convert the A/V and/or auxiliary data to Ethernet frames and assign the Ethernet frames a traffic class. The MAC layer within the server 122 may utilize Audio Video Bridging (AVB) to enable timely transmissions of the Ethernet frames to the video display panel 126 and speakers 128a and 128b within specified latency constraints.

The asymmetric Ethernet optical PHY transceiver may receive the Ethernet frames, convert the electrical signal to an optical signal and transmit the optical signal via the optical Ethernet link 132a to the optical network 110. The optical network 110 may receive the one or more Ethernet frames via a symmetric Ethernet optical PHY or an asymmetric Ethernet optical PHY transceiver. A MAC layer within the optical network 110 may administer transmission of the Ethernet frames to the video display panel 126 and speakers 128a and 128b according to the specified latency constraints via a symmetric Ethernet optical PHY or an asymmetric Ethernet optical PHY. In this regard, the video display panel 126 and speakers 128a and 128b may perform signal processing operations on the received optical signal and convert the optical signal to an electrical signal within an asymmetric Ethernet optical PHY transceiver. A MAC layer within the video display panel 126 and speakers 128a and 128b may convert the Ethernet frames back to the video interface format such as HDMI, Display Port, DVI or native video and the A/V data may be rendered.

Although the A/V and/or auxiliary data may be processed by the server 122 via a display interface, for example HDMI, Display Port or DVI, such that it may be intended for device to device data exchange and may not be network aware nor comprise a means of network identification (for example a network destination address), the A/V and/or auxiliary data may be encapsulated within Ethernet frames at, for example, in the server 122 and transported via optical Ethernet links 132a and 132b and the optical network 110. The encapsulated A/V and/or auxiliary data may be decapsulated at a destination device such as the video display panel 126 and speakers 128a and 128b. Accordingly, in various embodiments of the invention, the point to point oriented display interface traffic may be received by the video display panel 126 and speakers 128a and 128b as though the video display panel 126 and speakers 128a and 128b were directly attached to the server 122.

In addition, the video display panel 126 and speakers 128a and 128b may transmit lower bandwidth data upstream. The lower bandwidth data may comprise service requests, control information and/or security operation communications for example. The invention is not limited in this regard and any other suitable lower bandwidth data may be communicated on the upstream links.

The upstream lower bandwidth data may be passed to the MAC layer of the video display panel 126 and speakers 128a and 128b that may generate one or more Ethernet frames and schedule transmission of the Ethernet frames to the optical network 110. The asymmetric Ethernet optical PHY transceiver within the video display panel 126 and speakers 128a and 128b may process the Ethernet frames, convert the electrical signal to an optical signal and transmit the Ethernet frames via optical signal on the optical Ethernet link 132b to the optical network 110. The optical network 110 may receive the optical signal from the video display panel 126 and speakers 128a and 128b via a symmetric Ethernet optical PHY or an asymmetric Ethernet optical PHY transceiver and convert the optical signal carrying the Ethernet frames back to an electrical signal. A MAC layer within the optical network 110 may schedule transmission of the Ethernet frames and the Ethernet frames may be transmitted via a symmetric Ethernet optical PHY or an asymmetric Ethernet optical PHY transceiver within to the server 122. In this regard, the server 122 may perform signal processing operations on the received optical signal and convert the optical signal to an electrical signal carrying the Ethernet frames. The MAC layer within the server 122 may decapsulate the lower bandwidth data and the data may be processed for operations residing within the server 122.

Figure 1B:
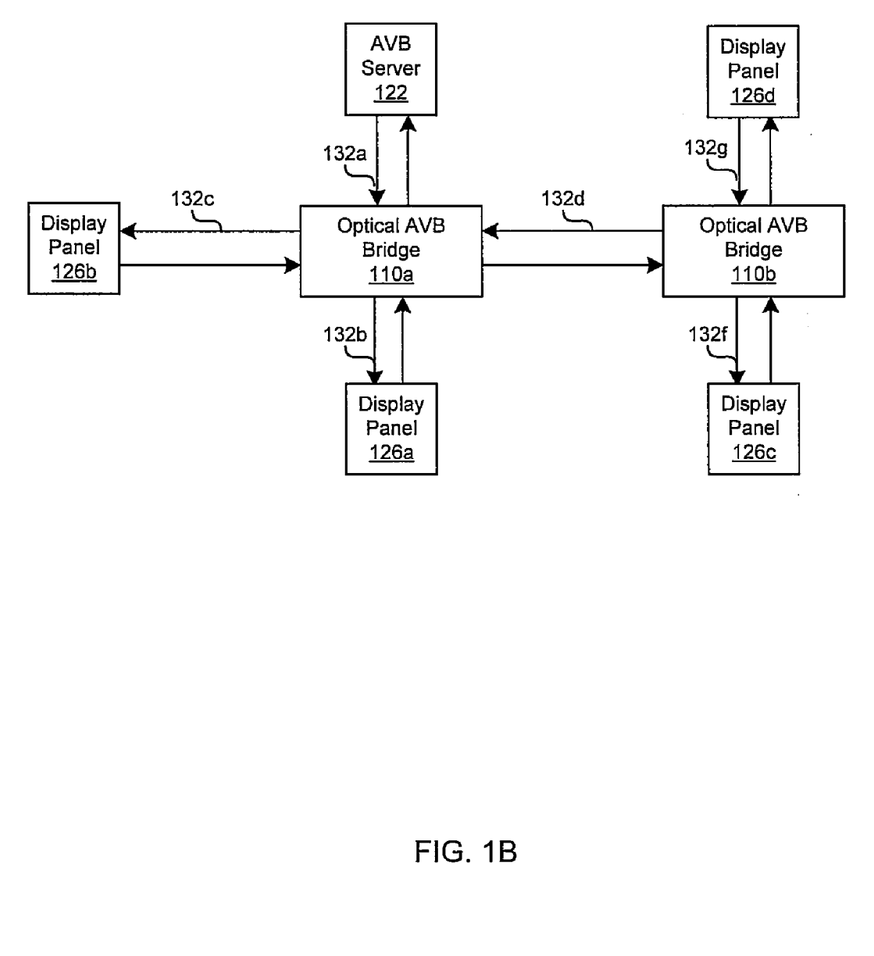
FIG. 1B is a diagram illustrating an exemplary system for transfer of video, audio and/or auxiliary data via an optical network comprising one or more intermediate nodes utilizing AVB services and an asymmetric Ethernet optical physical layer (PHY) connection, in accordance with an embodiment of the invention.

FIG. 1B is a block diagram illustrating an exemplary network that supports Audio/Video Bridging (AVB) services and asymmetrical Ethernet optical PHY communications in accordance with an embodiment of the invention. Referring to FIG. 1B, there is shown an AVB server 122, a plurality of AVB optical Ethernet bridges 110a and 110b, a plurality of AVB display panels 126a, 126b, 126c and 126d and a plurality of optical Ethernet links 132a, 132b, 132c, 132d, 132f and 132g.

The AVB server 122 in FIG. 1B may be similar or substantially the same as the server 122 in FIG. 1A. The AVB display panels 126a, 126b, 126c and 124d may each be similar to or substantially the same as the video display panel 124 and speakers 128a and 128b shown in FIG. 1A. The optical Ethernet links 132a, 132b, 132c, 132d, 132f and 132g may be similar to or substantially the same as the Ethernet links 132a, 132b, 133a and 133b in FIG. 1A.

The optical AVB bridges 110a and 110b may comprise suitable logic, circuitry and/or code that may enable AVB services within an AVB network for example, a local area network (LAN). The optical AVB bridges 110a and 110b may be configured to transmit and/or receive Ethernet frames via optical Ethernet links wherein the optical Ethernet links may be coupled to distinct optical ports within the optical AVB bridges 110a and 110b. For example, the optical AVB bridge 110a may receive and/or transmit Ethernet frames via optical Ethernet links 132a, 132b, 132c and 132d. The optical AVB bridge 110a may communicate with the optical AVB bridge 110b via the optical Ethernet link 132d. The optical AVB bridge 110a may communicate with the AVB display panel 126a and 126b via the optical Ethernet links 132b and 132c, respectively, as well as the AVB server 122 via the optical Ethernet link 132a. Moreover, the optical AVB Ethernet bridges 110a and 110b may comprise optical Ethernet PHY transceivers that may be enabled to handle symmetric and/or asymmetric optical traffic. In addition, the optical AVB bridge 110b may be coupled to distinct optical ports within the AVB display panels 126c and 124d and may be enabled to transmit and/or receive Ethernet frames with AVB display panels 126*c* and 124*d* via optical Ethernet links 132*f* and 132*g* respectively.

Notwithstanding, one or more of the AVB server 122, AVB display panels 126*a*, 126*b*, 126*c* and 126*d* and optical AVB bridges 110*a* and 110*b* may comprise asymmetric Ethernet optical PHY transceivers wherein high bandwidth data may be transmitted downstream from the server 122 to one or more of the AVB display panels 126*a*, 126*b*, 126*c* and 126*d* while lower bandwidth data for example auxiliary data may be transmitted upstream from one or more of the AVB display panels 126*a*, 126*b*, 126*c* and 126*d* to the server 122.

In operation, the AVB server 122 may be enabled to exchange optical AVB data streams with one or more AVB display panels 126*a*, 126*b*, 126*c* and 126*d* via the optical Ethernet links 132*a*, 132*b*, 132*c*, 132*d*, 132*f*, 132*g* and optical AVB bridges 110*a* and 110*b* wherein one or more of the AVB devices may comprise asymmetric Ethernet optical PHY transceivers. For example, the AVB server 122 may exchange AVB data with one AVB display panel and/or may communicate and multi-cast optical transmissions with a plurality of participating AVB display panels.

In various embodiments of the invention, AVB devices comprising the AVB server 122, AVB display panels 126*a*, 126*b*, 126*c* and 126*d* and/or optical AVB bridges 110*a* and 110*b* may associate with each other based on an exchange of logical link discovery protocol (LLDP) messages, which may be periodically transmitted from the respective devices. The LLDP messages describe the attributes of the device that transmits the message. For example, the AVB server 122 may transmit LLDP messages, which describe the attributes of the AVB server 122 via optical Ethernet link 132*a*. Similarly, the optical AVB bridge 110*a* may transmit LLDP messages, which describe the attributes of the optical AVB bridge 110*a* via optical Ethernet links 132*a*, 132*b*, 132*c* and 132*d*. In a substantially similar manner, the optical AVB bridge 110*b* and AVB display panels 126*a*, 126*b*, 126*c* and 126*d* may transmit one or more LLDP messages that may describe their respective attributes via their respective coupled optical Ethernet links.

The LLDP messages may comprise a "time-synch" capable attribute and an AVB-capable attribute. An AVB enabled device such as the server 122, AVB display panels 126*a*, 126*b*, 126*c* and 126*d* and optical AVB bridges 110*a* and 110*b*, that receives an LLDP message, that may comprise the time-synch-capable attribute and AVB-capable attribute via an optical port, may label the optical port to be an "AVB" port. Labeling the optical port to be an AVB port may enable the AV device to utilize AVB services. The AVB devices, which may be reachable via the optical port, may be referred to as "participating" devices. The participating devices may utilize AVB services and may be enabled to transmit optical AVB streams among the participating AVB device.

Prior to transmitting the AVB data streams, a source of the transmission for example the AVB server 122 may propagate requests for reservation of resources among the participating AVB devices. The reservation message may comprise a set of reservation parameters, for example, QoS descriptors based on a traffic class designation. AVB devices enabled to receive the transmitted AVB data streams, for example, one or more of the AVB display panels 126*a*, 126*b*, 126*c* and 126*d* may register requests for delivery of the AVB streams. The invention is not limited in this regard, for example, a client may be the source of an auxiliary data stream transmission and may propagate a request for reservation of resources while the server 122 and/or another participating device may register a request for delivery of the auxiliary data stream.

Ethernet frames may comprise time stamps which may enable the AVB network to transport the Ethernet frames along an end to end path from a data source to a data destination such that the latency of the transport along the path may be within specified latency targets or desired values. For example, the path from the AVB server 122 to the AVB display panel 126*c* may comprise the Ethernet link 132*a*, the AVB optical AVB bridge 110*a*, the Ethernet link 132*d*, the AVB optical AVB bridge 110*b* and the Ethernet link 132*f*. Along the path, the AVB optical AVB bridge 110*a* may utilize the time stamps to determine a time interval for queuing and forwarding of Ethernet frames received via the interface 132*a* and forwarded via the interface 132*d*. Similarly, the AVB optical AVB bridge 110*b* may utilize the time stamps to determine a time interval for the queuing and forwarding of Ethernet frames received via the Ethernet interface 132*d* and forwarded via the interface 132*f*.

Figure 2:
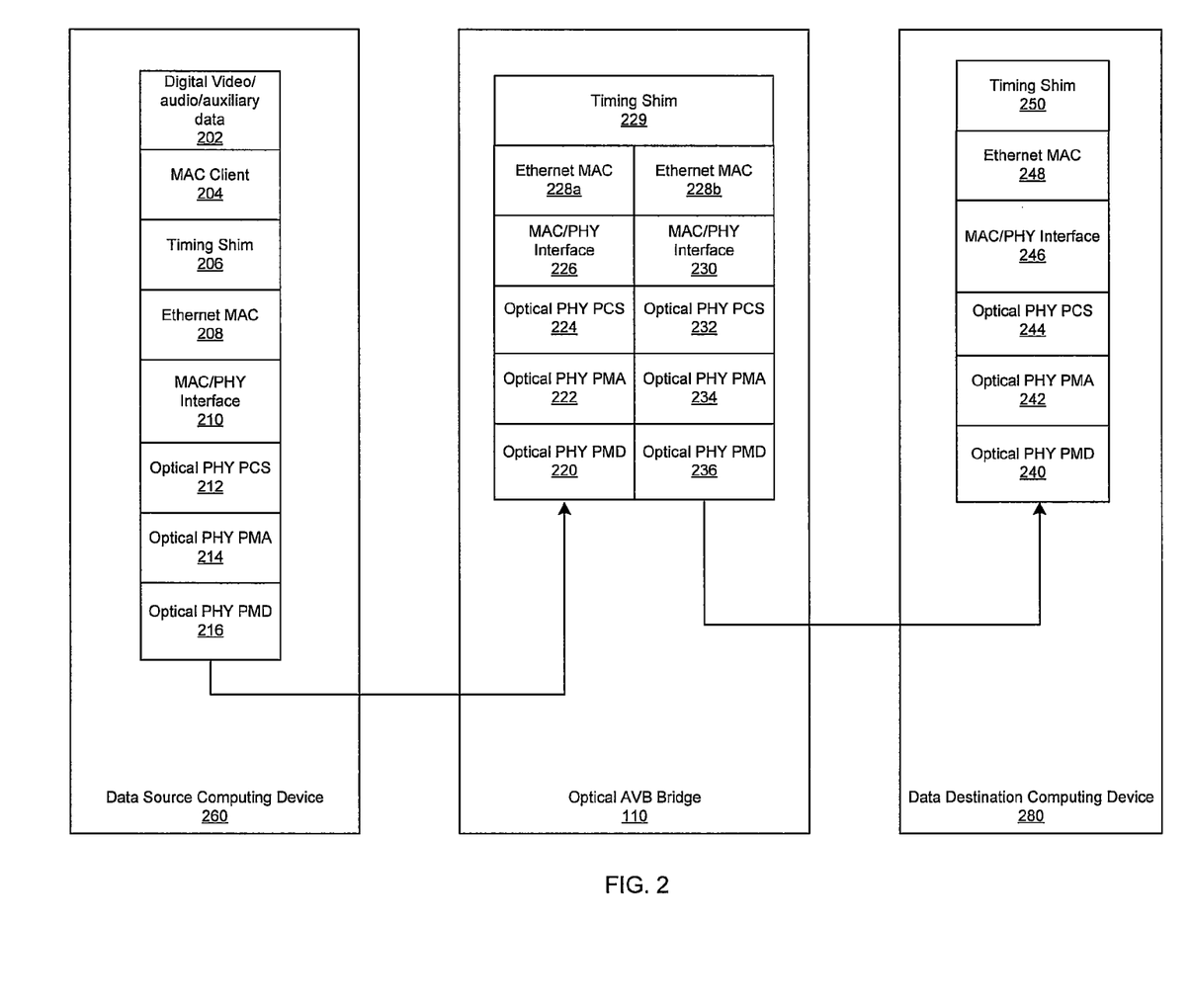
FIG. 2 is a diagram illustrating exemplary processes utilized in AVB managed data transfers from an upstream link partner to a downstream link partner utilizing asymmetric Ethernet optical PHY technology, in accordance with an embodiment of the invention.

FIG. 2 is a diagram illustrating exemplary transfer of video, audio (A/V) and/or auxiliary data traffic across an optical network utilizing Audio/Video Bridging (AVB), in accordance with an embodiment of the invention. Referring to FIG. 2, there is shown a data source computing device 260 comprising a digital A/V and/or auxiliary data block 202, a MAC client block 204, a timing shim block 206, an Ethernet MAC block 208 and a MAC/PHY interface block 210, an optical PHY physical coding sub-layer (PCS) block 212, an optical PHY physical medium attachment (PMA) block 214 and an optical PHY physical medium dependent (PMD) block 216. In addition, an optical AVB bridge 110 may comprise an optical PHY PMD block 220, an optical PHY PMA block 222, an optical PHY PCS block 224, a MAC/PHY interface block 226, an Ethernet MAC block 228*a*, a timing shim 229*a*, a timing shim 229*b* an Ethernet MAC block 228*b*, a MAC/PHY interface block 230, an optical PHY PCS block 232, an optical PHY PMA block 234 and an optical PHY PMD block 236. Moreover, a data destination computing device 280 may comprise an optical PHY PMD block 240, an optical PHY PMA block 242, an optical PHY PCS block 244, MAC/PHY interface block 246, an Ethernet MAC block 248 and a timing shim 250. Specific process layers higher than the MAC level may be varied among different embodiments of the invention and are not shown in FIG. 2.

The data source computing device 260 and the data destination computing device 280 may comprise suitable logic, circuitry and/or code that may enable handling A/V and/or auxiliary data. In addition, the data source computing device 260 and the data destination device 280 may utilize Audio/Video Bridging (AVB) services. In one aspect of the invention, the data source computing device 260 may be an upstream link partner wherein an asymmetrical Ethernet optical PHY transceiver may be configured to transmit high frequency data, for example, A/V and/or auxiliary data and receive lower frequency auxiliary data. Accordingly, the data destination device 280 may be a downstream link partner wherein an asymmetrical Ethernet optical PHY may be configured to receive high frequency data, for example, A/V and/or auxiliary data and transmit lower frequency auxiliary data. In this regard, the data source computing device 260 may be similar or substantially the same as the server 122 described in FIG. 1A and the data destination computing device 280 may be similar or substantially the same as the video display panel 126 and speakers 128*a* and 128*b* described in FIG. 1A for example.

In another embodiment of the invention, the data source computing device 260 may be a downstream link partner wherein an asymmetrical Ethernet optical PHY transceiver may be configured to transmit lower frequency data, for example, auxiliary data and receive high frequency data, for example, A/V and/or auxiliary data. Accordingly, the data destination device 280 may be an upstream link partner wherein an asymmetrical Ethernet optical PHY may be configured to receive low frequency data, for example, auxiliary data and transmit high frequency A/V and/or auxiliary data. In this regard, the data source computing device 260 may be similar or substantially the same as the video display panel 126 and speakers 128a and 128b and the data destination device 280 may be similar or substantially the same as the server 122 described in FIG. 1A for example.

The optical AVB bridge 110 may be similar or substantially the same as the optical bridges 110a and/or 110b in FIGS. 1A and/or 1B.

The digital A/V and/or auxiliary data 202 may be stored in memory and/or may be generated by one or more applications that may be executing within the data source computing device 260. The digital A/V and/or auxiliary data 202 may be encrypted or unencrypted and may be compressed or uncompressed. The digital video, audio and/or auxiliary data 202 may be passed to the MAC client 204.

In some embodiments of the invention, the digital A/V and/or auxiliary data 202 may be passed to a display interface encapsulation process wherein the digital A/V and/or auxiliary data 202 may be encapsulated into a format such as HDMI, Display Port or DVI for example. The display interface encapsulated digital A/V and/or auxiliary data 202 may comprise instructions to enable rendering of the A/V data on the data destination computing device 280. In addition, the digital A/V and/or auxiliary data 202 may be encapsulated into an Ethernet payload format. Accordingly, Ethernet payloads may comprise compressed, uncompressed, packetized, unpacketized, encapsulated, decapsulated or otherwise processed data so as to be formatted as one or more video or multimedia streams. For example, one or more of IP datagrams, HDMI datastreams, DVI datastreams, DisplayPort datastreams, raw video, and/or raw audio/video may be converted to an Ethernet payload. The Ethernet payload may be passed to the MAC client block 204.

The MAC client block 204 may comprise suitable logic, circuitry, and/or code that may enable reception of digital A/V and/or auxiliary data 202 and/or the Ethernet payloads and may enable encapsulation of the digital A/V and/or auxiliary data 202 and/or the Ethernet payloads in one or more Ethernet frames. The Ethernet frames may be passed to the timing shim 206.

The timing shim 206 may comprise suitable logic, circuitry and/or code that may enable reception of Ethernet frames the MAC client block 204. The timing shim 206 may append time synchronization information, such as a time stamp, to the Ethernet frames. The timing shim 206 may, for example, append a time stamp when an Ethertype field within the Ethernet frame indicates that the Ethernet frame is enabled to utilize AVB capabilities for transport across a network. The timing shim 206 may pass the appended Ethernet frames to the Ethernet MAC 208.

The Ethernet MAC 208 may comprise suitable logic, circuitry, and or code that may enable addressing and/or access control to an optical network and may enable the transmission of the Ethernet frames via an optical network. In this regard, the Ethernet MAC 208 may be enabled to buffer, prioritize, or otherwise coordinate the transmission and/or reception of data via the MAC/PHY interface 210. The Ethernet MAC 208 may be enabled to perform additional packetization, depacketization, encapsulation, and decapsualtion of data. The Ethernet MAC 208 may enable generation of header information within the Ethernet frames, which enable the utilization of AVB services within a network for transport of the Ethernet frames. The Ethernet MAC 208 may also enable traffic shaping of transmitted Ethernet frames by determining time instants at which Ethernet frames may be transmitted to an optical network. The Ethernet MAC 208 may also enable generation of header information within the Ethernet frames, which utilize conventional Ethernet services. The conventional Ethernet services may not utilize traffic shaping and/or AVB services for example. The Ethernet MAC 208 may pass the Ethernet frames and/or link management control signals to the MAC/PHY interface 210.

The MAC/PHY interface may comprise suitable logic, circuitry and/or code to enable data transfers between the Ethernet MAC 208 and the optical PHY PCS 212. The MAC/PHY interface may, for example, comprise a transmit bus and/or a receive bus that may transfer parallel bits of data between the Ethernet MAC 208 and the optical PHY PCS 212. The number of bits transferred depends on which IEEE Ethernet standard or non-standard scheme is utilized for an embodiment of the invention.

The optical PHY PCS 212 may comprise suitable logic, circuitry and/or code to receive data from the MAC/PHY interface and transmit data to the optical PHY PMA 214 and/or receive data from the optical PHY PMA 214 and transmit data to the optical MAC/PHY 210. In this regard, the optical PHY PCS 212 may manage resource contention in embodiments of the invention that may carry multiple streams of data per optical Ethernet link. In addition, the optical PHY PCS 212 may encode data received from the MAC/PHY interface 210 to maintain DC balance and enhance error detection and/or may decode data received from the optical PHY PMA 214. In various embodiments of the invention, the optical PHY PCS 212 may enable serialization/de-serialization of data. In this regard, during serialization, parallel data received from the MAC/PHY interface 210 may be converted to serial data for transmission to the optical PHY PMA 214. During deserialization, serial data received from the optical PHY PMA 214 may be converted to parallel for transmission to the MAC/PHY interface 210.

The optical PHY PMA 214 may comprise suitable logic, circuitry and or code to receive data from the optical PHY PCS 212 and transmit data to the optical PHY PMD 216 and/or receive data from the optical PHY PMD 216 and transmit data to the optical PHY PCS 212. In various embodiments of the invention, the PHY PMA 214 rather than the optical PHY PCS 212 may perform the serialize/de-serialize operations. In addition, the optical PHY PMA 214 may recover clock information from encoded data supplied by the optical PHY PMD 216. Moreover, the PHY PMA 214 may map bits from one layer to another.

The optical PHY PMD 216 may comprise suitable logic, circuitry and or code to receive data from the optical PHY PMA 214 and transmit data to the optical AVB bridge 110 and/or receive data from the optical AVB bridge 110 and transmit data to the optical PHY PMA 212. The optical PHY PMD 216 may convert electrical signals to optical signals and/or optical signals to electrical signals. In this regard, a transmitter sub-assembly may comprise a light source such as a light emitting diode (LED) or a laser diode for example, that may impress an optical signal on a fiber medium and enable transport of the Ethernet frames to the AVB bridge 110 utilizing AVB services. Moreover, a receiver sub-assembly may convert optical signals received from the AVB bridge 110 to electrical signals. In this regard, the receiver may comprise a photo diode to detect and convert the optical signals to electrical signals for example.

The optical PHY PMD blocks 220, 236 and 240, the optical PHY PMA blocks 222, 234 and 242, the optical PHY PCS blocks 224, 232 and 244 and the MAC/PHY interface blocks 226, 230 and 246 may be similar or substantially the same as the optical PHY PMD 216, optical PHY PMA 214, the optical PHY PCS 212 and the MAC/PHY interface 210 respectively. Moreover, the Ethernet MAC 228a, 228b and 248 may be similar or substantially the same as the Ethernet MAC 208.

Optical signals may be received by the optical AVB bridge 110 from the data source computing device 260 via the optical PHY PMD block 220 that may convert the optical signals to electrical signals of encoded data and may pass the encoded data to the optical PHY PMA block 222. The encoded data may be processed and passed to the optical PHY PMA block 222. The encoded data may be passed to the optical PHY PCS block 224 where it may be decoded and passed to the MAC/PHY interface 226. The MAC/PHY interface may pass the data to the Ethernet MAC 228a The Ethernet MAC 228a may enable the Ethernet bridge 110 to receive the Ethernet frames from the data source computing device 260 and may determine that the data destination computing device 280 is the destination for receipt of the Ethernet frames. The Ethernet frame may be sent to the timing shim 229 that may extract the time synchronization information appended to the Ethernet frame and may append updated time synchronization information. The Ethernet MAC layer 228b may utilize time stamp information and quality of service descriptors to schedule the transmission of the Ethernet frames to the data destination device 280. The MAC 228b may pass the Ethernet frames to the MAC/PHY interface block 230. The optical PHY blocs PCS 232, PMA 234 and PMD 236 may process the data in operations similar to or substantially the same as in optical PHY blocks PCS 212, PMA 214 and PMD and transmit an optical signal to the data destination computing device 280.

Accordingly, the optical signals may be received and processed in the optical PHY blocks PMD 240, PMA 242, PCS 244 and MAC/PHY interface 246 may process the data in operations similar to or substantially the same as in blocks PMD 220, PMA 222, PCS 224 and MAC/PHY interface 226. Ethernet frames from the MAC/PHY interface 226 may be sent to the Ethernet MAC 248. The Ethernet MAC 248 may extract the Ethernet payloads and information comprised in fields of the Ethernet frames as well as any information comprised within additional encapsulation fields if present, for example, display interface fields and may reconstruct the digital video/audio/auxiliary data according to information therein. The MAC layer may determine the type of data extracted and/or reconstructed from the frame and/or encapsulation fields and may process, store and/or forward the data accordingly. The MAC layer may determine that data may be forwarded to higher level applications for rendering of the video and/or audio content. The timing shim 250 may extract time synchronization information from the Ethernet frame.

Figure 3:
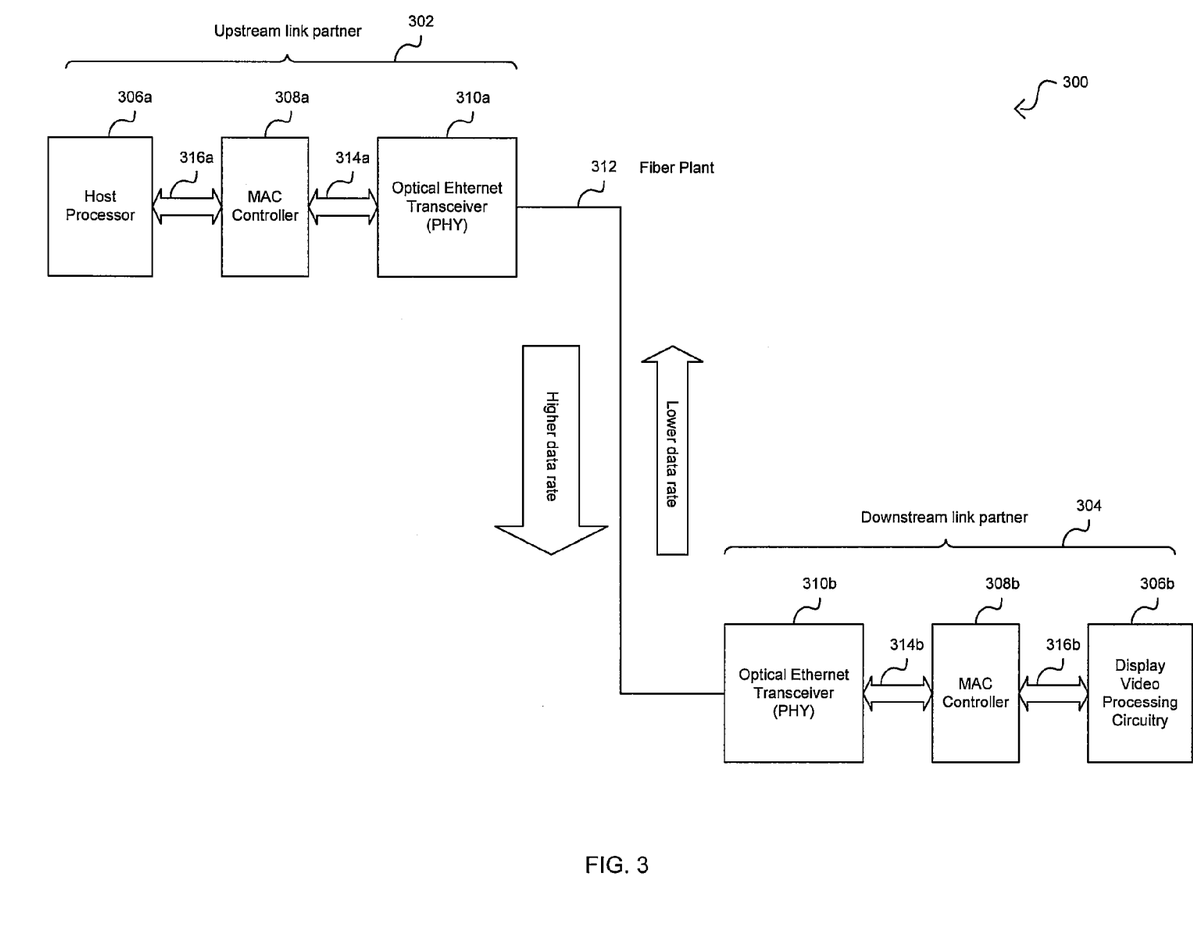
FIG. 3 is a block diagram illustrating an Ethernet system over fiber optic cabling link between an upstream link partner and a downstream link transmitting asymmetric data traffic with AVB services, in connection with an embodiment of the invention.

FIG. 3 is a block diagram illustrating an Ethernet system over an optical fiber cabling link between an upstream link partner and a downstream link partner for asymmetric data traffic supported by Audio Video Bridging (AVB) services, in accordance with an embodiment of the invention. Referring to FIG. 3, there is shown a system 300 that comprises an upstream link partner 302 and a downstream link partner 304. The upstream link partner 302 may comprise a host processing block 306a, a medium access control (MAC) controller 308a, and an optical transceiver 304a. The downstream link partner 304 may comprise a display video processing block 306b, a MAC controller 308b, and an optical transceiver 310b. Notwithstanding, the invention is not limited in this regard.

The upstream link partner 302 and the downstream link partner 304 communicate via one or more fiber cables 312. The fiber cables 312 may be similar or substantially the same as the optical Ethernet links 132a, 132b 133a and 133b described in FIG. 1A.

The transceiver 310a may comprise suitable logic, circuitry, and/or code that may enable asymmetric Ethernet optical communication, such as transmission and reception of data, for example, between the upstream link partner 302 and the downstream link partner 304, for example. In this regard, the transceiver 310a may enable optical transmission at a high data rate to the downstream link partner 304 while also enabling reception at a low data rate from the downstream link partner 304. Similarly, the transceiver 310b may comprise suitable logic, circuitry, and/or code that may enable asymmetric Ethernet optical communication between the downstream link partner 304 and the upstream link partner 302, for example. In this regard, the transceiver 310b may enable optical transmission at a low data rate to the upstream link partner 302 while also enabling reception at a high data rate from the upstream link partner 302.

The data transmitted and/or received by the optical transceivers 310a and 310b may be formatted in a manner that may be compliant with the well-known OSI protocol standard, for example. The OSI model partitions operability and functionality into seven distinct and hierarchical layers. Generally, each layer in the OSI model is structured so that it may provide a service to the immediately higher interfacing layer. For example, layer 1, or physical (PHY) layer, may provide services to layer 2 and layer 2 may provide services to layer 3. In this regard, the transceiver 310a may enable optical PHY layer operations that are utilized for asymmetric data communication with the downstream link partner 304. Moreover, the optical transceiver 310a may enable PHY layer operations that are utilized for asymmetric data communication with the upstream link partner 302.

The optical transceivers 310a and 310b may enable asymmetric communications. In this regard, the data rate in the upstream and/or the downstream direction may be <10 Mbps, 10 Mbps, 100 Mbps, 1000 Mbps (or 1 Gbps) and/or 10 Gbps, or any suitable data rate for example. The optical transceivers 310a and 310b may support standard-based asymmetric data rates and/or non-standard asymmetric data rates. The optical transceivers 310a and 310b may utilize wave division multiplexing (WDM) where multiple data streams are carried on a plurality of multiplexed optical channels or carrier wavelengths within an optical signal's bandwidth. The optical transceivers 310a and 310b are not limited with regard to modulation and/or demodulation techniques and may utilize any suitable form of modulation and/or demodulation.

The optical transceivers 310a and 310b may be configured to handle all the physical layer requirements, which may include, but are not limited to, encoding/decoding data, data transfer, serialization/deserialization (SERDES) and optical-electrical conversion in instances where such an operation is required. Data packets received by the optical transceivers 310a and 310b from MAC controllers 308a and 308b, respectively, may include data and header information for each of the above six functional layers. The optical transceivers 310a and 310b may be configured to encode data packets that are to be transmitted over the fiber cables 312 and/or to decode data packets received from the fiber cables 312.

The MAC controller 308a may comprise suitable logic, circuitry, and/or code that may enable handling of data link layer, layer 2, operability and/or functionality in the upstream link partner 302. Similarly, the MAC controller 308b may comprise suitable logic, circuitry, and/or code that may enable handling of layer 2 operability and/or functionality in the downstream link partner 304. The MAC controllers 308a and 308b may be configured to implement Ethernet protocols, such as those based on the IEEE 802.3 standard, for example. In various embodiments of the invention, one or more optical nodes, for example one or more optical Ethernet bridges, may be communicatively coupled to the upstream link partner 302 and the downstream link partner 304 such that data streams may be transported between the link partners via the one or more optical nodes. In this regard, Audio/Video Bridging protocol such as IEEE 802.1AS may be utilized to synchronize the upstream link partner 302 and the downstream link partner 304. Accordingly, an Audio/Video Bridging protocol such as IEEE 802.1Qat may be utilized to reserve resources for the data streams. Optical nodes comprised within the reserved path may implement IEEE 802.1Qav to govern forwarding and queuing of time sensitive data. Notwithstanding, the invention is not limited in this regard.

The MAC controller 308a may communicate with the transceiver 310a via an interface 314a and with the host processing block 306a via a bus controller interface 316a. The MAC controller 308b may communicate with the transceiver 310b via an interface 314b and with the display video processing block 306b via a bus controller interface 316b. The interfaces 314a and 314b correspond to Ethernet interfaces that comprise protocol and/or link management control signals. The interfaces 314a and 314b may be asymmetric interfaces. The bus controller interfaces 316a and 316b may correspond to PCI or PCI-X interfaces. Notwithstanding, the invention is not limited in this regard.

The host processing block 306a and the display video processing block 306b may comprise suitable logic, circuitry and/or code to enable graphics processing and/or rendering operations. The host processing block 306a and/or the display video processing block 306b may comprise dedicated graphics processors and/or dedicated graphics rendering devices. The host processing block 306a and the display video processing block 306b may be communicatively coupled with the MAC 308a and the MAC 308b respectively via the bus controller interfaces 316a and 316b respectively.

In an embodiment of the invention illustrated in FIG. 3, the host processing block 306a and the display video processing block 306b may represent layer 3 and above, the MAC controllers 308a and 308b may represent layer 2 and above and the transceivers 310a and 310b may represent the operability and/or functionality of layer 1 or an optical PHY layer. In this regard, the host processing block 306a and the display video processing block 306b may comprise suitable logic, circuitry, and/or code that may enable operability and/or functionality of the five highest functional layers for data packets that are to be transmitted over the cable 312. Since each layer in the OSI model provides a service to the immediately higher interfacing layer, the MAC controllers 308a and 308b may provide the necessary services to the host processing block 306a and the display video processing block 306b to ensure that data are suitably formatted and communicated to the optical transceivers 310a and 310b. During transmission, each layer may add its own header to the data passed on from the interfacing layer above it. However, during reception, a compatible device having a similar OSI stack may strip off the headers as the message passes from the lower layers up to the higher layers.

Figure 4:
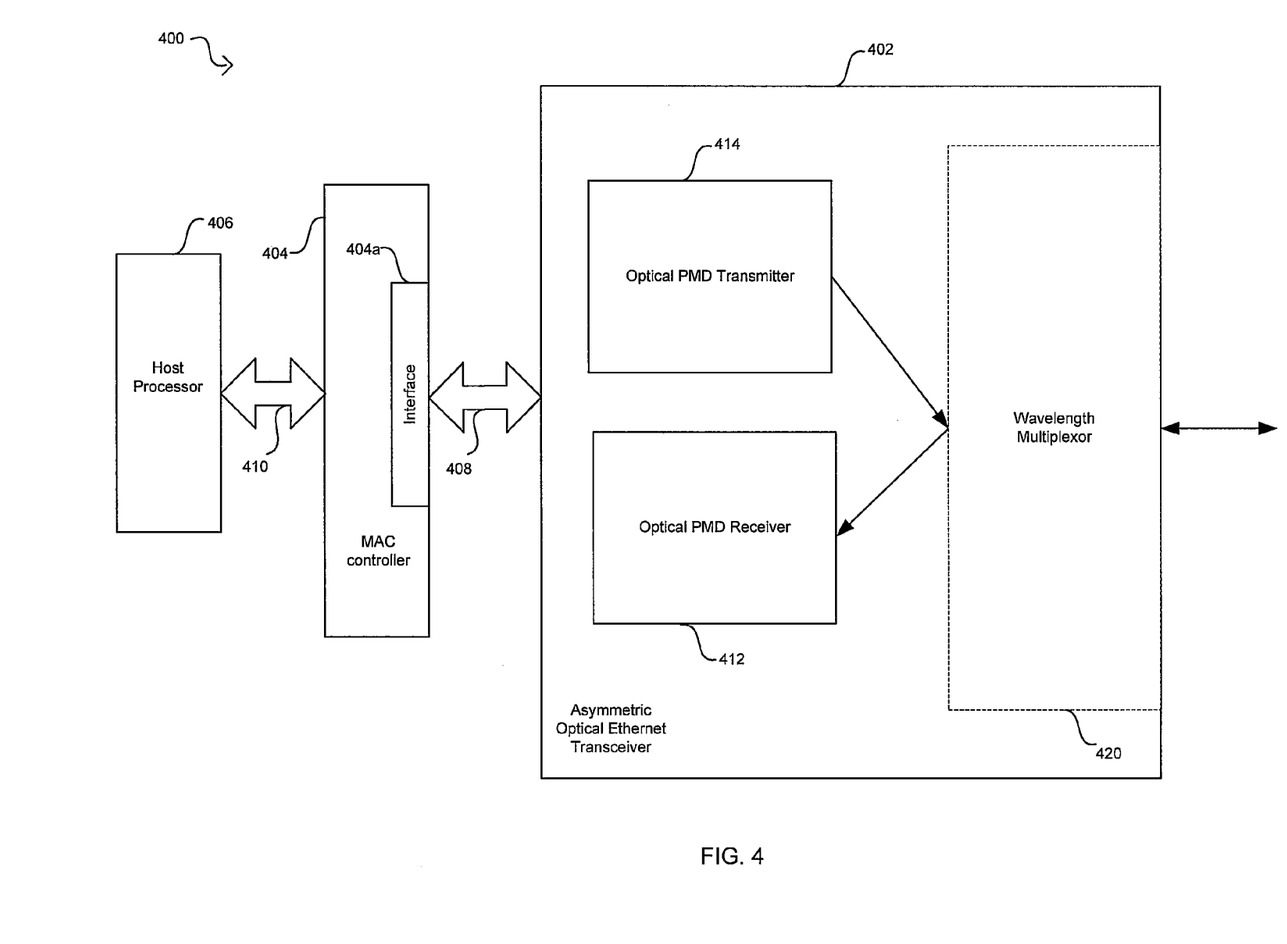
FIG. 4 is a block diagram illustrating an exemplary Ethernet transceiver architecture comprising an asymmetric optical PHY, in accordance with an embodiment of the invention.

FIG. 4 is a block diagram illustrating an exemplary Ethernet optical transceiver architecture comprising an asymmetric optical PHY, in accordance with an embodiment of the invention. Referring to FIG. 4, there is shown a link partner 400 that may comprise an optical transceiver 402, a MAC controller 404, a host processing block 406, an interface 408, and a bus controller interface 410 and an optional wavelength multiplexer 420.

The optical transceiver 402 may be an integrated device that comprises an optical physical media dependent (PMD) receiver 412, an optical PMD transmitter 414 and an optional wavelength multiplexer 420. The operation of the optical transceiver 402 may be the same as or substantially similar to the optical transceivers 310a and 310b as described in FIG. 3. For example, when the optical transceiver 402 is utilized in an upstream link partner, the optical transceiver 402 may enable a high rate for data transmission and a low rate for data reception. In another example, when the optical transceiver 402 may be utilized in a downstream link partner, the transceiver 402 may enable a low rate for data transmission and a high rate for data reception. In this regard, the optical transceiver 402 may provide layer 1 or optical PHY layer operability and/or functionality that may enable asymmetric data traffic.

Similarly, the operation of the MAC controller 404, the host processing block 406, the interface 408, and the bus controller 410 may be similar or substantially the same as the respective MAC controllers 308a and 308b, the host processing block 306a and the display video processing block 306b, interfaces 314a and 314b, and bus controller interfaces 316a and 316b as disclosed in FIG. 3. In this regard, the MAC controller 404, the host processing block 406, the interface 408, and the bus controller 410 may enable different data transmission and/or data reception rates when implemented in an upstream link partner or a downstream link partner. The MAC controller 404 may comprise an interface 404a that may comprise suitable logic, circuitry, and/or code to enable communication with the optical transceiver 402 at a plurality of data rates via the interface 408.

The asymmetric optical transceiver 402 may comprise suitable logic, circuitry, and/or code that may enable operability and/or functionality of optical PHY layer requirements for asymmetric data traffic. The asymmetric optical transceiver 402 may communicate with the MAC controller 404 via the interface 408. The asymmetric optical transceiver 402 may be configured to perform the physical coding sub layer (PCS) and physical media attachment (PMA) processes described in FIG. 2. In various embodiments of the invention, the asymmetric optical transceiver 402 may handle one or more serial data lanes for transmitting and receiving data from the optical PMD transmitter 414 and/or optical PMD receiver 412.

The asymmetric optical transceiver 402 as well as the optical PMD transmitter 414 and/or optical PMD receiver 412 may be configured to operate in one or more of a plurality of communication modes, wherein each communication mode may implement a different communication protocol. These communication modes may include, but are not limited to IEEE 802.3 standards 100BASE-LX10, 1000BASE-LX, 100BASE-BX10, 1000BASE-BX10, 1000BASE-PX10, 1000BASE-PX20, 1000BASE-ZX, 1000BASE-SX, 10GBASE-LR, 10GBASE-ER, 10GBASE-SR, 10GBASE-LRM and 10GBASE-LX4, or, other similar protocols and/or non-standard communication protocols that enable asymmetric optical data traffic. The asymmetric optical transceiver 402 may be configured to operate in a particular mode of operation upon initialization or during operation. In some embodiments of the invention, the communication mode 10GBASE-LX4 supporting data transfer over four strands of fiber may be utilized, for example, for downstream high data rate A/V traffic. In this regard, the aggregate data rate may be distributed over the four strands of fiber. Accordingly, each of the four strands of fiber may carry lower data rate traffic.

The optical PMD transmitter 414 may comprise suitable logic, circuitry, and/or code that may enable optical transmission of data from a transmitting link partner to a remote link partner via the fiber optic cable 312 in FIG. 3, for example. In this regard, when the transmitting link partner is an upstream link partner, the optical PMD transmitter 414 may operate at a higher data rate than the data rate received from the downstream link partner. Similarly, when the when the transmitting link partner is a downstream link partner, the optical PMD transmitter 414 may operate at a lower data rate than the data rate received from the upstream link partner.

The optical PMD receiver 412 may comprise suitable logic, circuitry, and/or code that may enable receiving data from a remote link partner via the optical cable 312, for example. In this regard, when the receiving link partner is an upstream link partner, the optical PMD receiver 412 may operate at a lower data rate than the data rate transmitted to the downstream link partner. Similarly, when the when the receiving link partner is a downstream link partner, the optical PMD receiver 412 may operate at a higher data rate than the data rate transmitted to the upstream link partner.

The wavelength multiplexer 420 may be an optional element within the optical transceiver 402 depending on the number and composition of optical channels handled relative to the number of fibers within the fiber cable 312. The wavelength multiplexer 420 may comprise suitable logic circuitry and/or code that may enable multiplexing a plurality of signals comprising different wavelengths or colors on one or more optical fibers in accordance with an embodiment of the invention. The wavelength multiplexer 420 may enable for example, wave division multiplexing (WDM), coarse wavelength division multiplexing (CWDM) or dense wavelength division multiplexing (DWDM). In another embodiment of the invention, a time division multiple access (TDMA) multiplexer may be utilized to handle a plurality of data streams within the optical transceiver 402. Moreover, multiple data rates may be handled by different channels within the wavelength multiplexer 420 or a TDMA multiplexer.

In operation, the link partner 400 may be an upstream link partner 302 or a down stream link partner 304 as shown in FIG. 3. In various embodiments of the invention, the link partner 400 may be configured to operate as an upstream link partner 302. In this case, the link partner 400 may be for example a video server 122 described with respect FIG. 1A that may transmit data at a high data rate and receive data at a lower data rate. In this regard, the host processing block 406 may manage transmission of high data rate A/V and/or auxiliary data via the MAC controller 404 (utilizing AVB services) and the optical transceiver 402 to an optical receiver within a downstream link partner 304. Accordingly, high data rate downstream traffic may be handled by network elements comprising for example the optical PMD transmitter 414, fiber cable 312 and one or more optical receivers within the downstream link partner 304. In various embodiments of the invention, highly sophisticated components for example, narrow bandwidth laser diodes such as distributed feedback (DFB) lasers, high performance fiber and/or avalanche photodiodes (APD) may be utilized for the A/V and/or auxiliary data. In addition, signal processing techniques such as clock recovery and pre-emphasis may be utilized.

In another embodiment of the invention, the link partner 400 may be configured to operate as a downstream link partner 304. In this regard, the link partner 400 may be, for example, the video panel 126 and/or speakers 128*a* and 128*b* described in FIG. 1A that may receive high bandwidth A/V and/or auxiliary data at a high data rate and transmit auxiliary data at a lower rate. In this regard, the host processing block 406 may manage transmission of the lower data rate auxiliary data via the MAC controller 404 (utilizing AVB services) and the optical transceiver 402 to an optical receiver within an upstream link partner 302. Accordingly, the lower data rate upstream traffic may be handled by network elements comprising, for example, the optical PMD transmitter 414, fiber cable 312 and one or more optical receivers within the upstream link partner 302.

In various embodiments of the invention, less sophisticated network elements may be utilized for the lower data rate traffic, for example, a Fabry-Perot laser or a light emitting diode (LED) may be utilized rather than a DFB laser. Moreover, lower performance or legacy fiber infrastructure may be utilized for lower data rate traffic. In addition, the optical PMD receiver 412 in the upstream link partner may, for example, handle the lower data rate traffic with a P-intrinsic-N (PIN) diode rather than an APD and/or may require less sophisticated signal processing logic, circuitry and/or code than the receivers in the downstream link partner handling high data rate traffic.

Performance benefits and/or cost savings may be enabled by transmitting and receiving traffic at a lower data rate in the upstream direction of an asymmetrical Ethernet optical PHY. For example, utilizing one or more of the less sophisticated network elements for lower data rate upstream traffic may enable a cost saving. Notwithstanding, utilizing one or more of the more sophisticated network elements for lower data rate upstream traffic may provide performance benefits such as extended length transmissions and/or greater capacity per Ethernet optical link.

Additional cost and/or performance benefits may be enabled in some embodiments of the invention comprising a point-to-multipoint network topology wherein an upstream link partner may have a plurality of downstream link partners. In this regard, the upstream link partner, for example the server 122, may broadcast one stream of high data rate A/V and/or auxiliary traffic that may be split into a plurality of optical data paths and transmitted to a plurality of down stream link partners. For example, a plurality of downstream link partners such as video display panels 126 and/or speakers 128*a* and 128*b* may receive and render the stream of high data rate A/V and/or auxiliary traffic. Accordingly, the plurality of video display panels 126 and/or speakers 128*a* and 128*b* may transmit lower data rate upstream traffic to the server 122. In this regard, the upstream link traffic may be multiplexed by the wavelength multiplexer 420.

In an embodiment of the invention, optical signals are communicated between an upstream link partner device 122 and one or more down stream link partner devices for example 126 and/or 128*a* and 128*b*, wherein each of the link partner devices 122 and 126 and/or 128*a* and 128*b* comprise an asymmetric Ethernet optical physical layer (PHY) to handle the communication. Moreover, optical communications between the link partners 122 and 126 and/or 128*a* and 182*b* are handled via A/V Bridging services with quality of service descriptors. The optical signals transmitted from the upstream link partner 122 to the downstream link partner 126 and/or 128*a* and 128*b* may comprise high bandwidth audio/video (A/V) optical signals. Low bandwidth optical signals may be transmitted from the downstream link partner 126 to the upstream link partner 122. Protocol data units (PDUs) may be generated comprising one or more of a time stamp value, a traffic class designation and/or a destination address.

Prior to communicating PDUs via an asymmetrical Ethernet optical PHY between the upstream link partner 122 and the downstream link partner 126 and/or 128a and 128b, a data rate request message and a resource reservation message may be generated based on one or more of a said time stamp value, a traffic class designation and/or a destination address. Furthermore, an upstream link partner 122 or downstream link partner 126 may register for the deliver of the PDUs via the asymmetric Ethernet optical PHY. The data rate within optical signals may be reduced prior to distribution of the optical signals among one or more links coupling the upstream link partner 122 and the downstream link partner 126. In this regard, the aggregate data rate may be distributed evenly or unevenly among the one or more optical links coupling the upstream link partner 122 and the downstream link partner 126 and/or 128a and 128b via the asymmetrical Ethernet optical PHY. The distributed communication rate received from the upstream link partner 122 or the down stream link partner 126 and/or 128a and 128b may be aggregated via the asymmetric optical PHY. The asymmetric Ethernet optical PHY may handle compressed and/or uncompressed video signals as well as encrypted o unencrypted video signals. Moreover, the communication optical signals may be modified and/or processed by at least one of forward error checking (FEC) and clock recovery.

Another embodiment of the invention may provide a machine-readable storage, having stored thereon, a computer program having at least one code section executable by a machine, thereby causing the machine to perform the steps as described herein for enabling communicating data via an asymmetric optical physical layer (PHY) operation for Ethernet A/V Bridging and Ethernet A/V Bridging extensions.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
in a first link partner device that comprises an asymmetric Ethernet optical PHY transceiver:
communicating optical signals to a corresponding second link partner device and receiving optical signals from said corresponding second link partner device, utilizing A/V Bridging services with quality of service descriptors, wherein said asymmetric Ethernet optical PHY transceiver is operable to transmit data utilizing one or more of a plurality of different rates in a first direction, and concurrently with said transmitting, to receive data utilizing one or more of a plurality of other different rates in a corresponding second direction.

2. The method according to claim 1, comprising communicating high bandwidth audio/video (A/V) optical signals to said corresponding second link partner device.

3. The method according to claim 1, comprising receiving low bandwidth optical signals from said corresponding second link partner device.

4. The method according to claim 1, comprising one or both of:
generating at least one protocol data unit (PDU) comprising one or more of a time stamp value, a traffic class designation and/or a destination address for communicating said optical signals to said corresponding second link partner device; and
receiving at least one PDU comprising one or more of a time stamp value, a traffic class designation and a destination address for receiving said optical signals from said corresponding second link partner device;
via said asymmetric Ethernet optical PHY transceiver.

5. The method according to claim 4, comprising requesting a data rate for one or both of:
communicating said at least one PDU to said corresponding second link partner device; and
receiving said at least one PDU from said corresponding second link partner device;
via said asymmetric Ethernet optical PHY transceiver.

6. The method according to claim 4, comprising generating a reservation message for, one or both of:
transmitting said at least one PDU to said corresponding second link partner device; and
receiving at least one PDU from said corresponding second link partner device;
via said asymmetric Ethernet optical PHY transceiver based on one or more of said time stamp value, said traffic class designation and/or said destination address.

7. The method according to claim 4, comprising generating a registration message for one or both of:
delivery of said at least one PDU to said corresponding second link partner device; and
receiving said at least one PDU from said corresponding second link partner device;
via said asymmetric Ethernet optical PHY transceiver.

8. The method according to claim 1, comprising reducing a communication rate of said optical signals for distribution of said optical signals among one or more optical links coupling said first link partner device to said second link partner device, for said communicating signals to said corresponding second link partner device and/or said receiving signals from said corresponding second link partner device, via said asymmetric Ethernet optical PHY transceiver.

9. The method according to claim 1, comprising distributing an aggregate communication rate evenly or unevenly among one or more optical links coupling said first link partner device to said second link partner device, for said communicating signals to said corresponding second link partner device and/or for said receiving signals from said corresponding second link partner device, via said asymmetric Ethernet optical PHY transceiver.

10. The method according to claim 9, comprising aggregating said distributed communication rate from said one or more optical links coupling said first link partner device to said second link partner device, for said communicating signals to said corresponding second link partner device and/or for said receiving signals from said corresponding second link partner device, via said asymmetric Ethernet optical PHY transceiver.

11. The method according to claim 1, wherein said asymmetric Ethernet optical PHY transceiver handles compressed and/or uncompressed video signals.

12. The method according to claim 1, wherein said asymmetric Ethernet optical PHY transceiver handles encrypted and/or unencrypted video signals.

13. The method according to claim 1, comprising modifying one or more of said communicated optical signals utilizing forward error checking (FEC) and said received optical signals utilizing clock recovery.

14. A system for communicating data, the system comprising:
one or more circuits for use within a first link partner device, said first link partner device comprising an asymmetric Ethernet optical PHY transceiver, said one or more circuits being operable to:
communicate optical signals to a corresponding second link partner device and receive optical signals from said corresponding second link partner device, utilizing A/V Bridging services with quality of service descriptors, wherein said asymmetric Ethernet optical PHY transceiver is operable to transmit data utilizing one or more of a plurality of different rates in a first direction, and concurrently with said transmitting, to receive data utilizing one or more of a plurality of other different rates in a corresponding second direction.

15. The system according to claim 14, wherein said one or more circuits are operable to communicate high bandwidth audio/video (A/V) optical signals to said corresponding second link partner device.

16. The system according to claim 14, wherein said one or more circuits are operable to receive low bandwidth optical signals from said corresponding second link partner device.

17. The system according to claim 14, wherein said one or more circuits are operable to, one or both of:
generate at least one protocol data unit (PDU) comprising one or more of a time stamp value, a traffic class designation and/or a destination address for communicating said optical signals to said corresponding second link partner device; and
receive at least one PDU comprising one or more of a time stamp value, a traffic class designation and a destination address for receiving said optical signals from said corresponding second link partner device;
via said asymmetric Ethernet optical PHY transceiver.

18. The system according to claim 17, wherein said one or more circuits are operable to request a data rate for one or both of:
communicating said at least one PDU to said corresponding second link partner device;
receiving said at least one PDU from said corresponding second link partner device;
via said asymmetric Ethernet optical PHY transceiver.

19. The system according to claim 17, wherein said one or more circuits are operable to generate a reservation message for, one or both of:
transmitting said at least one PDU to said corresponding second link partner device; and
receiving at least one PDU from said corresponding second link partner device;
via said asymmetric Ethernet optical PHY transceiver based on one or more of said time stamp value, said traffic class designation and/or said destination address.

20. The system according to claim 17, wherein said one or more circuits are operable to generate a registration message for one or both of:
delivery of said at least one PDU to said corresponding second link partner device; and
receiving said at least one PDU from said corresponding second link partner device;
via said asymmetric multi-rate Ethernet optical PHY.

21. The system according to claim 14, wherein said one or more circuits are operable to reduce a communication rate of said optical signals for distribution of said optical signals among one or more optical links coupling said first link partner device to said second link partner device, for said communicating signals to said corresponding second link partner device and/or said receiving signals from said corresponding second link partner device, via said asymmetric Ethernet optical PHY transceiver.

22. The system according to claim 14, wherein said one or more circuits are operable to distribute an aggregate communication rate evenly or unevenly among one or more optical links coupling said first link partner device to said second link partner device, for said communicating signals to said corresponding second link partner device and/or for said receiving signals from said corresponding second link partner device, via said asymmetric Ethernet optical PHY transceiver.

23. The system according to claim 22 wherein said one or more circuits are operable to aggregate said distributed communication rate from said one or more optical links coupling said first link partner device to said second link partner device, for said communicating signals to said corresponding second link partner device and/or for said receiving signals from said corresponding second link partner device, via said asymmetric Ethernet optical PHY transceiver.

24. The system according to claim 14, wherein said asymmetric Ethernet optical PHY transceiver handles compressed and/or uncompressed video signals.

25. The system according to claim 14, wherein said asymmetric Ethernet optical PHY transceiver handles encrypted and/or unencrypted video signals.

26. The system according to claim 14, wherein said one or more circuits are operable to modify one or more of said communicated optical signals utilizing forward error checking (FEC) and said received optical signals utilizing clock recovery.

* * * * *